United States Patent
Lin et al.

(10) Patent No.: US 12,296,303 B2
(45) Date of Patent: May 13, 2025

(54) FILTER MEMBRANE AND METHOD FOR MAKING THE SAME

(71) Applicant: TAIWAN SEMICONDUCTOR MANUFACTURING COMPANY, LTD., Hsinchu (TW)

(72) Inventors: En-Tian Lin, Hsinchu (TW); Chwen Yu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 204 days.

(21) Appl. No.: 17/682,254

(22) Filed: Feb. 28, 2022

(65) Prior Publication Data

US 2023/0138216 A1     May 4, 2023

Related U.S. Application Data

(60) Provisional application No. 63/275,039, filed on Nov. 3, 2021.

(51) Int. Cl.
    *B01D 67/00*     (2006.01)
    *B01D 69/02*     (2006.01)

(52) U.S. Cl.
    CPC ....... *B01D 67/003* (2013.01); *B01D 67/0004* (2013.01); *B01D 67/0027* (2013.01); *B01D 69/02* (2013.01); *B01D 2221/14* (2013.01); *B01D 2323/24* (2013.01); *B01D 2323/28* (2013.01); *B01D 2325/021* (2013.01); *B01D 2325/08* (2013.01)

(58) Field of Classification Search
CPC ............ B01D 67/003; B01D 67/0004; B01D 67/0027; B01D 67/00791; B01D 67/0032; B01D 67/0034; B01D 67/00; B01D 69/02; B01D 69/10; B01D 69/12; B01D 2221/14; B01D 2323/24; B01D 2323/28; B01D 2323/21811; B01D 2323/64; B01D 2325/021
USPC .................................... 210/500.22
See application file for complete search history.

(56) References Cited

U.S. PATENT DOCUMENTS

2006/0102556 A1*   5/2006   Piletsky ................. B01D 69/02
                                                                           210/500.34
2015/0246325 A1*   9/2015   Singh ..................... B01D 69/08
                                                                           210/500.23

* cited by examiner

*Primary Examiner* — Akash K Varma
(74) *Attorney, Agent, or Firm* — Birch, Stewart, Kolasch & Birch, LLP

(57) ABSTRACT

A method for making a filter membrane includes: forming a polymer layer; applying a plurality of nanoparticles on the polymer layer, the nanoparticles being self-assembled to form a closed pack arrangement on the polymer layer; heating the nanoparticles such that a portion of the polymer layer contacting the nanoparticles is softened so that the nanoparticles are sunk into the polymer layer; and removing the nanoparticles from the polymer layer so that the polymer layer is formed with a plurality of pores penetrating the polymer layer and being arranged in a honeycomb pattern.

20 Claims, 10 Drawing Sheets

FILTER MEMBRANE AND METHOD FOR MAKING THE SAME

REFERENCE TO RELATED APPLICATION

This Application claims priority to U.S. Provisional Application No. 63/275,039 filed on Nov. 3, 2021, the contents of which is hereby incorporated by reference in its entirety.

BACKGROUND

With the continuous shrinking of modern semiconductor devices, elimination of particle contaminants from process fluids (e.g., process gases or liquids) is particularly important for preventing such contaminants from damaging the semiconductor devices.

Filter membranes are commonly used for filtering process fluids. It is therefore desirable to provide a filter membrane with uniform pore size and pore distribution as well as to lower manufacturing costs of the filter membrane.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
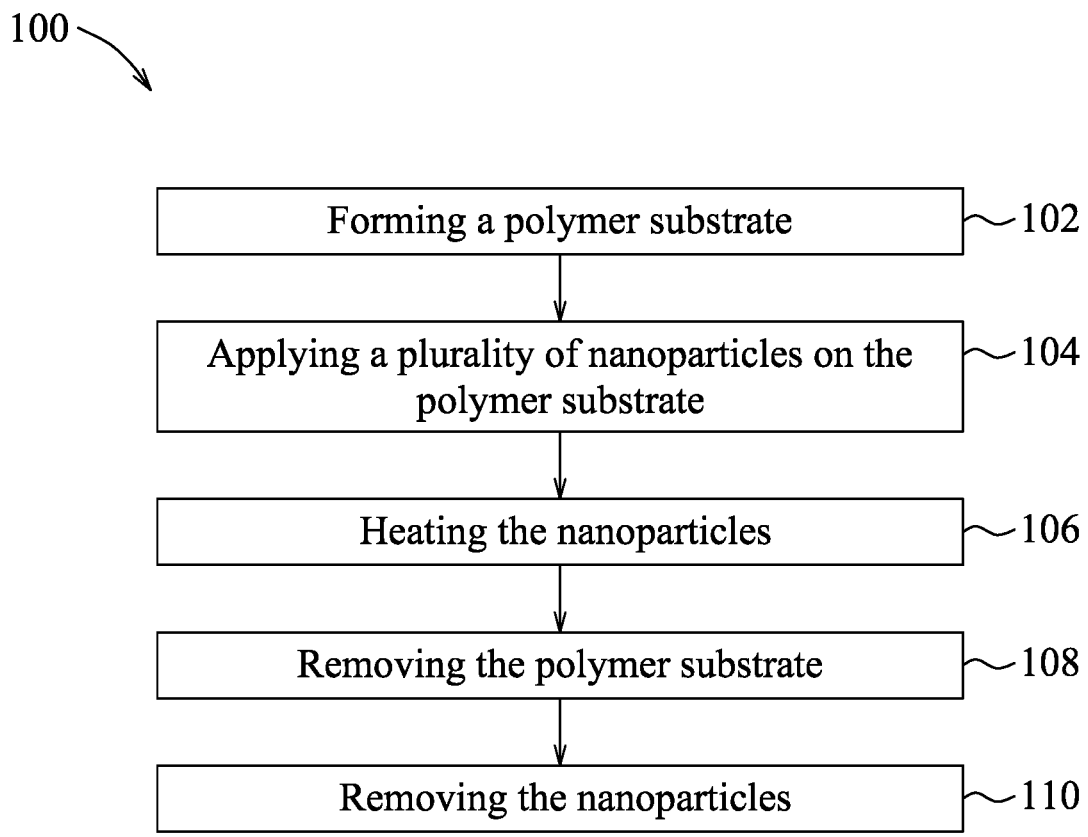
FIG. 1 is a flow diagram of a method for making a filter membrane in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "above," "over," "downwardly," "upwardly," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a method 100 for manufacturing a filter membrane 200 (see FIG. 6) in accordance with some embodiments. FIGS. 2 to 6 are schematic views showing intermediate stages of the method 100 as depicted in FIG. 1. Additional steps can be provided before, after or during the method 100, and some of the steps described herein may be replaced by other steps or be eliminated. Similarly, further additional features may be present in the filter membrane 200, and/or features present may be replaced or eliminated in additional embodiments.

Figure 2:
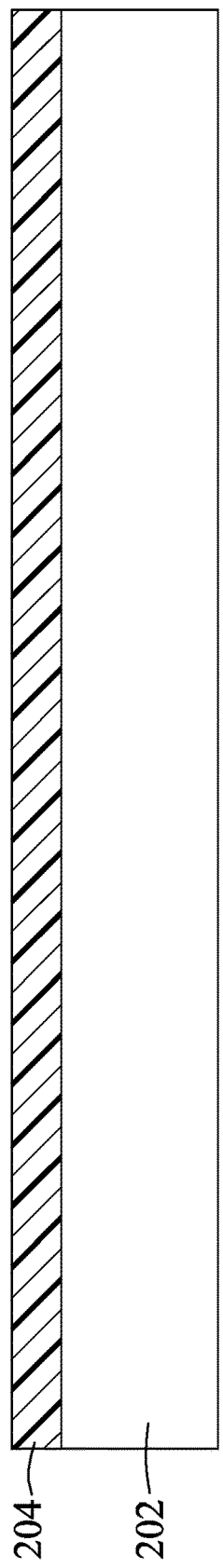
FIGS. 2 to 7 show intermediate steps of the method for making the filter membrane in accordance with some embodiments.

Referring to FIG. 1, the method 100 begins at block 102, where a polymer layer is formed. Referring to FIG. 2, in some embodiments, the polymer layer 204 may be formed and disposed on a holder 202. In some embodiments, the polymer layer 204 may be made of a thermoplastic polymer. In some embodiments, the polymer layer 204 may be made of fluoropolymer, polyolefins, polysulfones, polyaryletherketone (PAEK), other suitable materials, or any combination thereof. In some embodiments, the polymer layer 204 may be made of polytetrafluoroethylene (PTFE), polyvinylidene fluoride (PVDF), perfluoroalkoxy alkanes (PFA), polyethylene (PE) (e.g., high density polyethylene (HDPE)), polypropylene (PP), polyarylsulfone (PAS), polyethersulfone (PES), polysulfone (PSU), polyether ether ketone (PEEK), other suitable materials, or any combination thereof. In some embodiments, the polymer layer 204 may be made by applying a polymer solution on the holder 202, followed by rotating the holder 202 to evenly distribute the polymer solution on the holder 202 (e.g., in a rotation speed of about 3000 rpm or other suitable speed). Then, the polymer solution may be heated for solidification of the polymer, thereby obtaining the polymer layer 204. In some embodiments, the polymer solution may first be heated at a first temperature (e.g., from about 80° C. to about 120° C., but other range values are also within the scope of this disclosure) to evaporate a solvent (e.g., ketone-based solvent, ether-based solvent, alcohol-based solvent, or other suitable solvents) in the polymer solution, followed by annealing at a second temperature, which is lower than the melting point of the polymer layer 204 (e.g., from about 180° C. to about 220° C. when the polymer layer 204 is made of PTFE, but other range values are also within the scope of this disclosure) to further solidify the polymer and to lower the stress in the polymer layer 204. If the first temperature is too low, such as lower than about 80° C., the solvent in the polymer solution may not be evaporated. If the first temperature is too high, such as higher than about 120° C., the heating process may be less energy-efficient. If the second temperature is too low, such as lower than about 180° C., the polymer may not be sufficiently solidified or the stress within the polymer layer 204 may not be effectively relieved. If the second temperature is too high, such as higher than about 220° C., the polymer layer 204 may be heated into a flowable state, thereby worsening the uniformity of the polymer layer 204. In some embodiments, the holder 202 may be a silicon wafer/substrate (e.g., a fine-grain silicon wafer), a silicon oxide wafer/substrate, a quartz substrate, a metal substrate (e.g., a stainless substrate, etc.), or other suitable substrates. In some embodiments, the holder 202 may have a surface roughness within about ±0.5 nm, but other range values are also within the scope of this disclosure; and the holder 202 may be treated by a suitable process, such as argon (Ar) annealing or vacuum annealing, to lower the surface roughness to a value within about ±0.24 nm, but other range values are also within the scope of this disclosure. If the roughness of the holder 202 is too high, such as greater than about ±0.5 nm, the polymer solution may not be evenly distributed thereon. In some embodiments, a roughness lower than about ±0.24 nm may be difficult or costly to obtain. In some embodiments, the holder 202 may be disposed on a rotatable pedestal (not shown) which may be used for rotating the holder 202 and the polymer solution disposed on the holder 202 for evenly distributing the polymer solution on the holder 202. In some embodiments, the polymer layer 204 may be made by melting a solid polymer material (e.g., polymer particles or other suitable types of materials) into a melted polymer, followed by evenly distributing the melted polymer onto the holder 202 by means of spin coating or other suitable techniques, followed by solidifying the melted polymer into the polymer layer 204.

Figure 3:
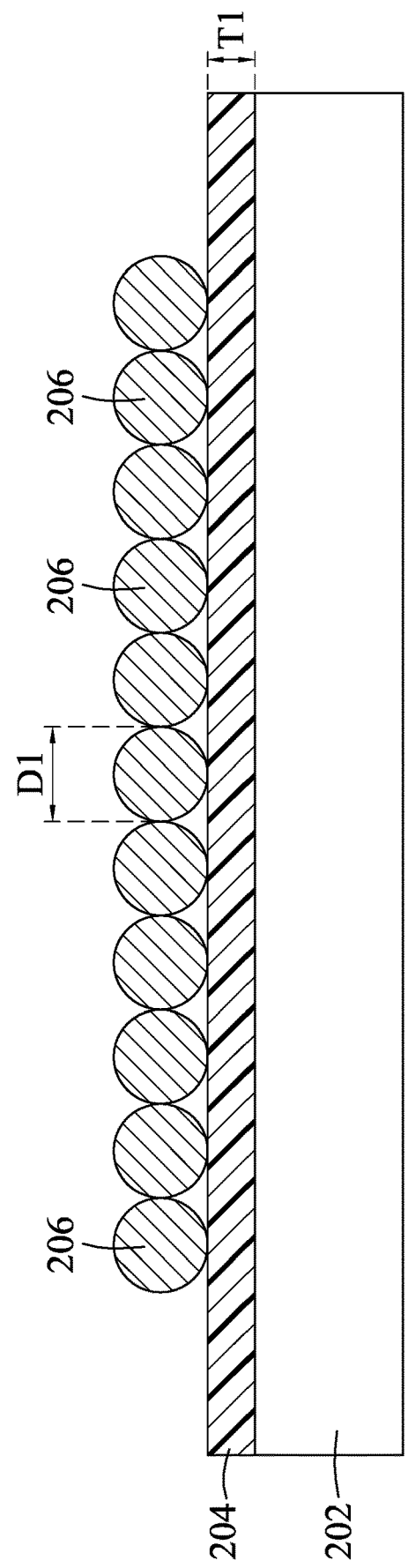
Figure 4:
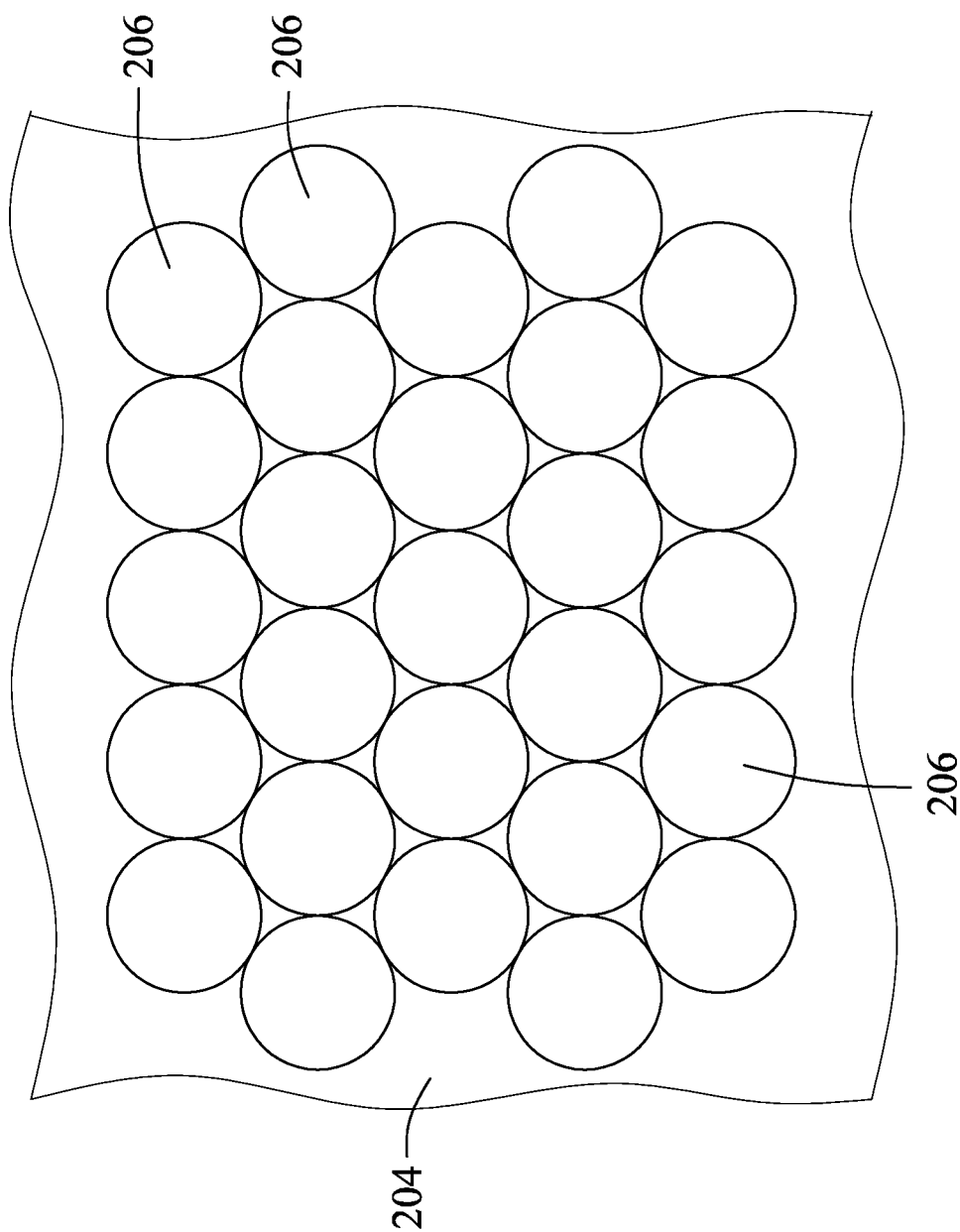

Referring to FIG. 1, the method 100 then proceeds to block 104, where a plurality of nanoparticles are applied on the polymer layer. Referring to FIGS. 3 and 4, in some embodiments, the nanoparticles 206 may be dispersed in a solution (not shown) (e.g., ketone-based solvent, ether-based solvent, alcohol-based solvent, or other suitable solutions), and then applied onto the polymer layer 204. In some embodiments, the solution with the nanoparticles 206 dispersed therein may be applied to the polymer layer 204 by spin coating, drop casting, evaporative deposition, dip coating, Langmuir-Blodgett technique, doctor blade coating, other suitable techniques, or any combination thereof. Then, in some embodiments, the nanoparticles 206 may form a closed pack arrangement (see FIG. 4) in the solution on the polymer layer 204 through self-assembling, which involves spontaneous organization of the nanoparticles 206 into an ordered arrangement driven by thermodynamic equilibrium or other suitable driving forces. In some embodiments, after the nanoparticles 206 and the solution are applied onto the polymer layer 204, the solution for dispersing the nanoparticles 206 may be removed by heating, venting, spinning the holder 202 and the polymer layer 204, other suitable techniques, or any combination thereof. In some embodiments, the removal of the solution may aid the self-assembly process. In some embodiments, each of the nanoparticles 206 may have a density greater than that of the polymer layer 204, such that the nanoparticles 206 may extend into the polymer layer 204 in a subsequent heating process, which will be described in detail hereinafter. In some embodiments, the nanoparticles 206 may be inorganic nanoparticles, metal nanoparticles, or a combination thereof. In some embodiments, the nanoparticles 206 may be made from silicon oxide, gold, iron, aluminum, or other suitable materials, which may be heated and sunk into the polymer layer 204 in a subsequent process. In some embodiments, the nanoparticles 206 are at least one of silicon oxide particles, gold particles, iron oxide (e.g., $Fe_3O_4$) particles, or aluminum particles. In some embodiments, the nanoparticles 206 made of metal can be effectively heated, which realizes a more energy sufficient manufacturing process. In some embodiments, the nanoparticles 206 made of gold may have high sphericity, resembling the shape of perfect spheres. In some embodiments, each of the nanoparticles 206 may have a diameter (D1) ranging from about 2 nm to about 100 nm, but other range values are also within the scope of this disclosure. In some embodiments, the diameter (D1) of each of the nanoparticles 206 may range from about 2 nm to about 5 nm, from about 5 nm to about 10 nm, from about 10 nm to about 20 nm, from about 20 nm to about 30 nm, from about 30 nm to about 40 nm, from about 40 nm to about 50 nm, from about 50 nm to about 60 nm, from about 60 nm to about 80 nm, or from about 80 nm to about 100 nm, but other range values are also within the scope of this application. If the diameter (D1) of each of the nanoparticles 206 is too large, such as larger than about 100 nm, or too small, such as smaller than about 2 nm, the particles 206 may be difficult or costly to make, or may not be round in shape, which will affect the quality of the filter membrane 200 (see FIG. 6). In some embodiments, a difference of diameters (D1) among the nanoparticles 206 may be not greater than about 15%, but other range values are also within the scope of this disclosure. In other words, if a largest round nanoparticle 206 and a smallest round nanoparticle 206 are present, the difference between the diameters of the largest and smallest round nanoparticles 206 is not greater than about 15%. If the difference is too large, such as greater than about 15%, the filter membrane 200 (see FIG. 6) may not have a uniform pore distribution. In some embodiments, a thickness (T1) of the polymer layer 204 may range from about one-half of the diameter (D1) of each of the nanoparticles 206 to about three times of the diameter (D1) of each of the nanoparticles 206, but other range values are also within the scope of this disclosure. If the thickness (T1) of the polymer layer 204 is too small, such as smaller than about one-half of the diameter (D1) of each of the nanoparticles 206, the mechanical strength of the filter membrane 200 (see FIG. 6) may be insufficient to sustain a fluid to be filtered. If the thickness (T1) of the polymer layer 204 is too large, such as larger than about three times of the diameter (D1) of each of the nanoparticles 206, the nanoparticles 206 may be entirely enclosed in the polymer layer 204 after a process of heating the nanoparticles 206 (such process will be described hereinafter), resulting in failure of forming pores in the polymer layer 204. In some embodiments, the thickness (T1) of the polymer layer 204 may range from about 1 nm to about 300 nm. In some embodiments, the thickness (T1) of the polymer layer 204 may range from about 1 nm to about 6 nm, from about 2.5 nm to about 15 nm, from about 5 nm to about 30 nm, from about 10 nm to about 60 nm, from about 15 nm to about 90 nm, from about 20 nm to about 120 nm, from about 25 nm to about 150 nm, from about 30 nm to about 180 nm, from about 40 nm to about 240 nm, or from about 50 nm to about 300 nm, but other range values are also within the scope of this application.

Figure 5:
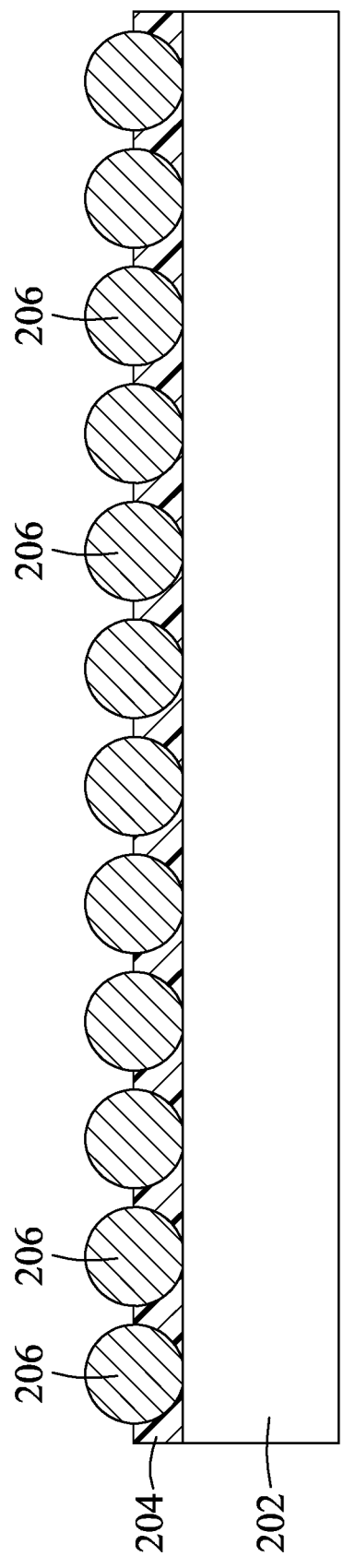

Referring to FIG. 1, the method 100 then proceeds to block 106, where the nanoparticles are heated. Referring to FIG. 5, in some embodiments, the nanoparticles 206 are heated such that a portion of the polymer layer 204 contacting the nanoparticles 206 is soften. Due to the softening of the polymer layer 204, the nanoparticles 206 are sunk into (i.e., are able to extend into) the polymer layer 204 and are in contact with the holder 202. In some embodiments, the nanoparticles 206 may be heated to a temperature that is not less than the glass transition temperature ($T_g$) of the polymer layer 204 so that the polymer layer 204 is soft enough for the nanoparticles 206 to be extended thereinto. In some embodiments, the nanoparticles 206 may be heated to a temperature that is not greater than the melting point of the polymer layer 204 so as to avoid melting the polymer layer 204 and to adversely affect the uniformity of the polymer layer 204. If the temperature of the heated nanoparticles 206 is too low, such as lower than the glass transition temperature of the polymer layer 204, the polymer layer 204 may not be soft enough for the nanoparticles 206 to extend thereinto. If the temperature of the heated nanoparticles 206 is too high, such as greater than about 230° C., the polymer layer 204 may be too soft, which may affect the quality of the filter membrane 200 (see FIG. 6). In some embodiments, the heating time of the nanoparticles 206 may be about 10 minutes to about 1 hour, but other range values are also within the scope of this disclosure. If the heating time of the nanoparticles 206 is too short, such as shorter than about 10 minutes, the nanoparticles 206 may not be sufficiently and uniformly heated to a desired temperature. If the heating time of the nanoparticles 206 is too long, such as longer than about 1 hour, energy may be wasted and the overall manufacturing time of the filter membrane 200 may be increased. In some embodiments, the nanoparticles 206 may be heated by electromagnetic wave, solar stimulator, laser, infrared, other suitable techniques, or any combination thereof. In some embodiments, when the nanoparticles 206 extend into the polymer layer 204, the nanoparticles 206 may push against the polymer layer 204, such that the nanoparticles 206 may slightly move away from each other (e.g., be separated from one another).

Figure 6:
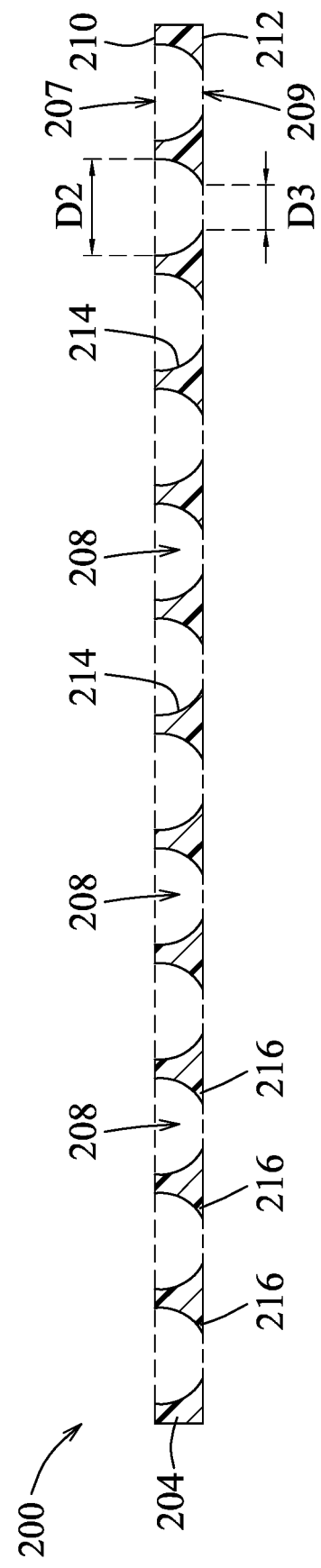

Referring to FIG. 1, the method 100 then proceeds to block 108, where the polymer layer is removed from the holder. Then, the method 100 proceeds to block 110, where the nanoparticles are removed. Referring to FIG. 6, after the nanoparticles 206 (see FIG. 5) extend into the polymer layer 204, the polymer layer 204 and the nanoparticles 206 are removed from the holder 202 (see FIG. 5), followed by removing the nanoparticles 206 from the polymer layer 204, thereby obtaining the filter membrane 200. In some embodiments, before forming the polymer layer 204 on the holder 202, a release agent (not shown) may be applied on the holder 202, followed by forming the polymer layer 204 on the release agent. In the step of removing the polymer layer 204 from the holder 202, the release agent may be dissolved by a solvent, such as isopropyl alcohol (IPA) or other suitable solvent, allowing the polymer layer 204 to be removed from the holder 202. In some embodiments, the nanoparticles 206 may be removed from the polymer layer 204 by stretching the polymer layer 204, blowing fluid (e.g., gas and/or liquid) to the polymer layer 204, ultrasonic vibration, applying an acid to dissolve the nanoparticles 206, other suitable techniques, or any combination thereof. In some embodiments, when the nanoparticles 206 are made from gold, the nanoparticles 206 may be dissolved by aqua regia, other suitable acids, or any combination thereof, while keeping the polymer layer 204 substantially free from damage. In some embodiments, when the nanoparticles 206 are made from silicon oxide, the nanoparticles 206 may be dissolved by hydrogen fluoride (HF), other suitable acids, or any combination thereof, while keeping the polymer layer 204 substantially free from damage.

Figure 7:
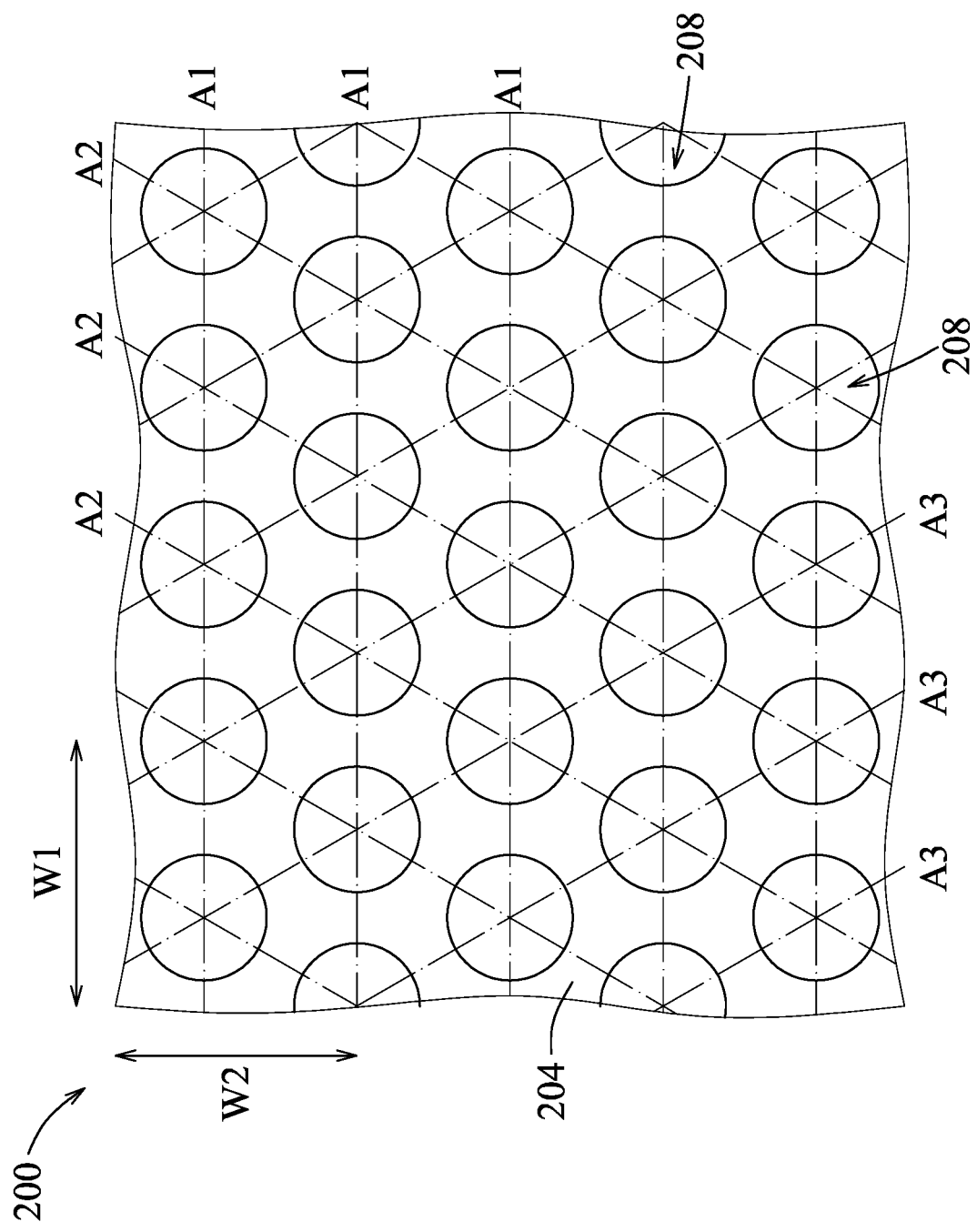

Referring to FIGS. 6 and 7, the filter membrane 200 includes the polymer layer 204, and a plurality of pores 208 that are formed in the polymer layer 204, that penetrate the polymer layer 204, and that are arranged in a honeycomb pattern. In some embodiments, each of the pores 208 corresponds in shape to a portion of a respective one of the nanoparticles 206 (see FIG. 5) in the polymer layer 204. In some embodiments, the polymer layer 204 has opposite first and second surfaces 210, 212, and each of the pores 208 penetrates the first and second surfaces 210, 212 of the polymer layer 204. In some embodiments, each of the pores 208 has a first opening 207 at the first surface 210 and a second opening 209 at the second surface 212. In some embodiments, a first diameter (D2) of the first opening 207 of each of the pores 208 is greater than a second diameter (D3) of the second opening 209 of the pore 208. In some embodiments, each of the pores 208 has a plurality of cross-sections that are parallel to the first and second surfaces 210, 212, and diameters of the cross-sections of each of the pores 208 increase in a direction from the second surface 212 toward the first surface 210. In some embodiments, each of the pores 208 may be defined by a pore-defining surface 214 of the polymer layer 204 which is a rounded curved surface connected between the first and second surfaces 210, 212. In some embodiments, a difference in maximum diameters of the pores 208 may not be greater than about 15%, but other range values are also within the scope of this disclosure. In other words, between a largest pore 208 and a smallest pore 208, the difference in the maximum diameters of the largest and smallest pores 208 is not greater than about 15%. If the difference in the maximum diameters is too large, such as greater than about 15%, the filter membrane 200 would not have a uniform pore size distribution, and the filtering efficiency of the filter membrane 200 may be adversely affected.

Referring to FIG. 7, in some embodiments, the pores 208 may be arranged in multiple rows with each row extending in a first direction (W1), and the pores 208 in each of the rows may be misaligned with the pores 208 in an adjacent row in a second direction (W2) that is substantially perpendicular to the first direction (W1). In some embodiments, the pores 208 may be aligned along a plurality of first axes (A1) which are parallel to the first direction (W1), a plurality of second axes (A2), each of which forms a 60-degree included angle with a corresponding one of the first axes (A1), and a plurality of third axes (A3), each of which forms a 60-degree included angle with a corresponding one of the first axes (A1) and a corresponding one of the second axes (A2). The center of each of the pores 208 lies at an intersection of a corresponding first axis (A1), a corresponding second axis (A2), and a corresponding third axis (A3).

Figure 8:
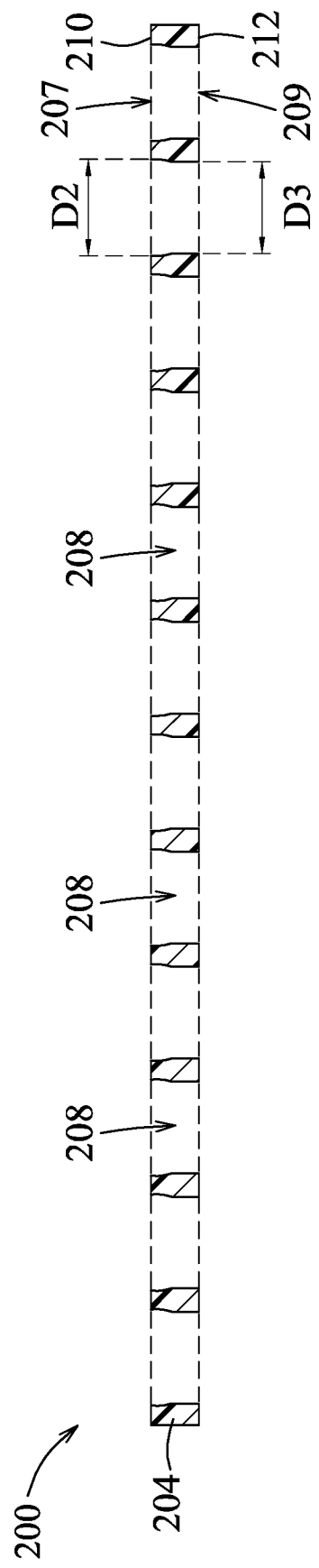
FIGS. 8 to 11 show structures of the filter membranes after being stretched, in accordance with some embodiments.

Referring to FIGS. 6 and 8, when the filter membrane 200 is used for filtering a fluid (not shown), particle contaminants in the fluid larger in size than the pores 208 may be blocked by the filter membrane 200 and are prevented from passing through the pores 208. In some embodiments, the pressure of the fluid may deform portions 216 of the polymer layer 204 such that the second diameter (D3) of the second opening 209 of each of the pores 208 is increased. In some embodiments, for each of the pores 208 in the deformed polymer layer 204, the second diameter (D3) may be at least about 60% of the first diameter (D2), but other range values are also within the scope of this disclosure. In each of the pores 208, if the second diameter (D3) is too small, such as less than about 60% of the first diameter (D2), the amount of the fluid passing through the pores 208 may be decreased, such that filter efficiency of the filter membrane 200 is decreased. In some embodiments, in each of the pores 208, the second diameter (D3) may be about 60% to about 65%, about 65% to about 70%, about 70% to about 75%, about 75% to about 80%, about 80% to about 85%, about 85% to about 90%, about 90% to about 95%, or about 95% to about 100% of the first diameter (D2), but other range values are also within the scope of this disclosure.

In certain embodiments, the structure of the filter membrane 200 shown in FIG. 8 may be obtained by stretching the filter membrane 200. To be specific, in some embodiments, after the nanoparticles 206 (see FIG. 5) are removed to obtain the filter membrane 200, the filter membrane 200 may be stretched in any direction (e.g., along the first and second directions (W1, W2)) (see FIG. 7), such that the portions 216 of the polymer layer 204 may be fractured and removed from the polymer layer 204 to obtain the structure shown in FIG. 8, where, in each of the pores 208, the first diameter (D2) may be greater than the second diameter (D3), the first diameter (D2) may be equal to the second diameter (D3), or the first diameter (D2) may be smaller than the second diameter (D3).

Figure 9:
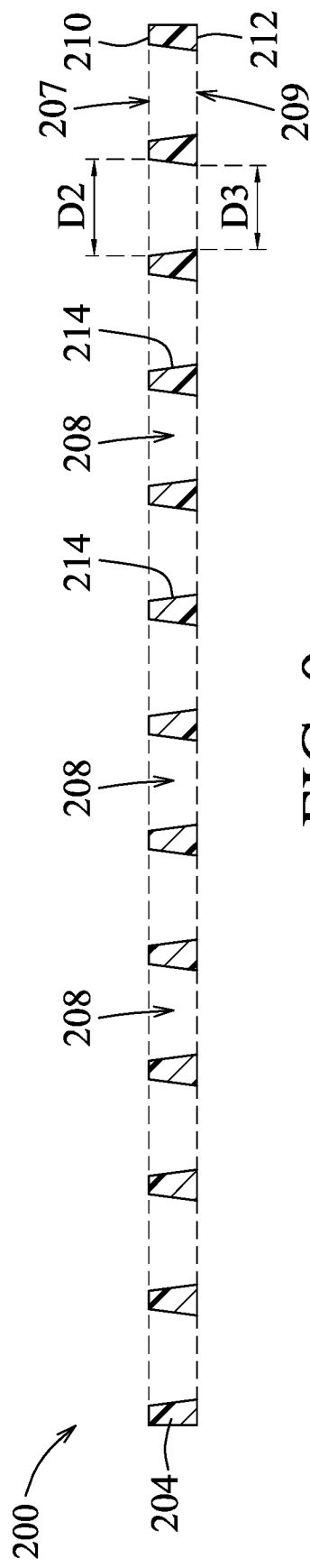

Referring to FIG. 9, in some embodiments, after the nanoparticles 206 (see FIG. 5) are removed to obtain the filter membrane 200, the filter membrane 200 may be stretched in any direction (e.g., along the first and second directions (W1, W2)) (see FIG. 7) to deform the polymer layer 204, such that the dimension of each of the pores 208 is increased. In some embodiments, for each of the pores 208 of the stretched filter membrane 200, the first diameter (D2) may be greater than the second diameter (D3), and both of the first and second diameters (D2, D3) of the stretched filter membrane 200 becomes larger as compared to those of the filter membrane 200 not subjected to stretching (i.e., the dimensions of the pores 208 are increased after stretching the filter membrane 200). In some embodiments, each of the pore-defining surfaces 214 may have a truncated conical shape.

Figure 10:
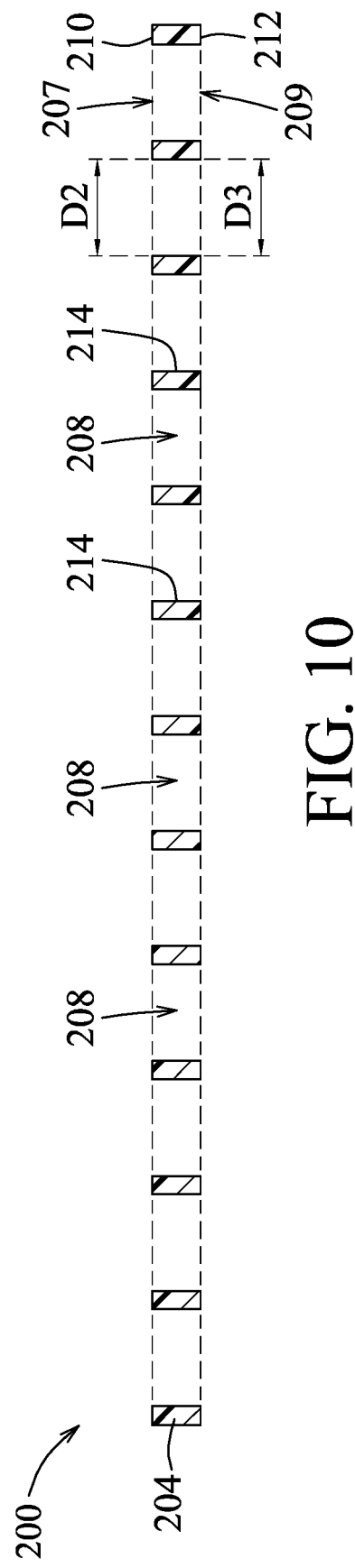

Referring to FIG. 10, in some embodiments, after the nanoparticles 206 (see FIG. 5) are removed to obtain the filter membrane 200, the filter membrane 200 may be stretched in any direction (e.g., along the first and second directions (W1, W2)) (see FIG. 7), such that the dimension of each of the pores 208 is increased. In some embodiments, the pore-defining surfaces 214 of the polymer layer 204 of the stretched filter membrane 200 may be substantially perpendicular to the first and second surfaces 210, 212 of the polymer layer 204, the first and second diameters (D2, D3) are substantially equal to each other, and both of the first and second diameters (D2, D3) of each of the pores 208 of the stretched filter membrane 200 becomes larger as compared to those of the filter membrane 200 not subjected to stretching (i.e., the dimensions of the pores 208 are increased after stretching the filter membrane 200).

Figure 11:
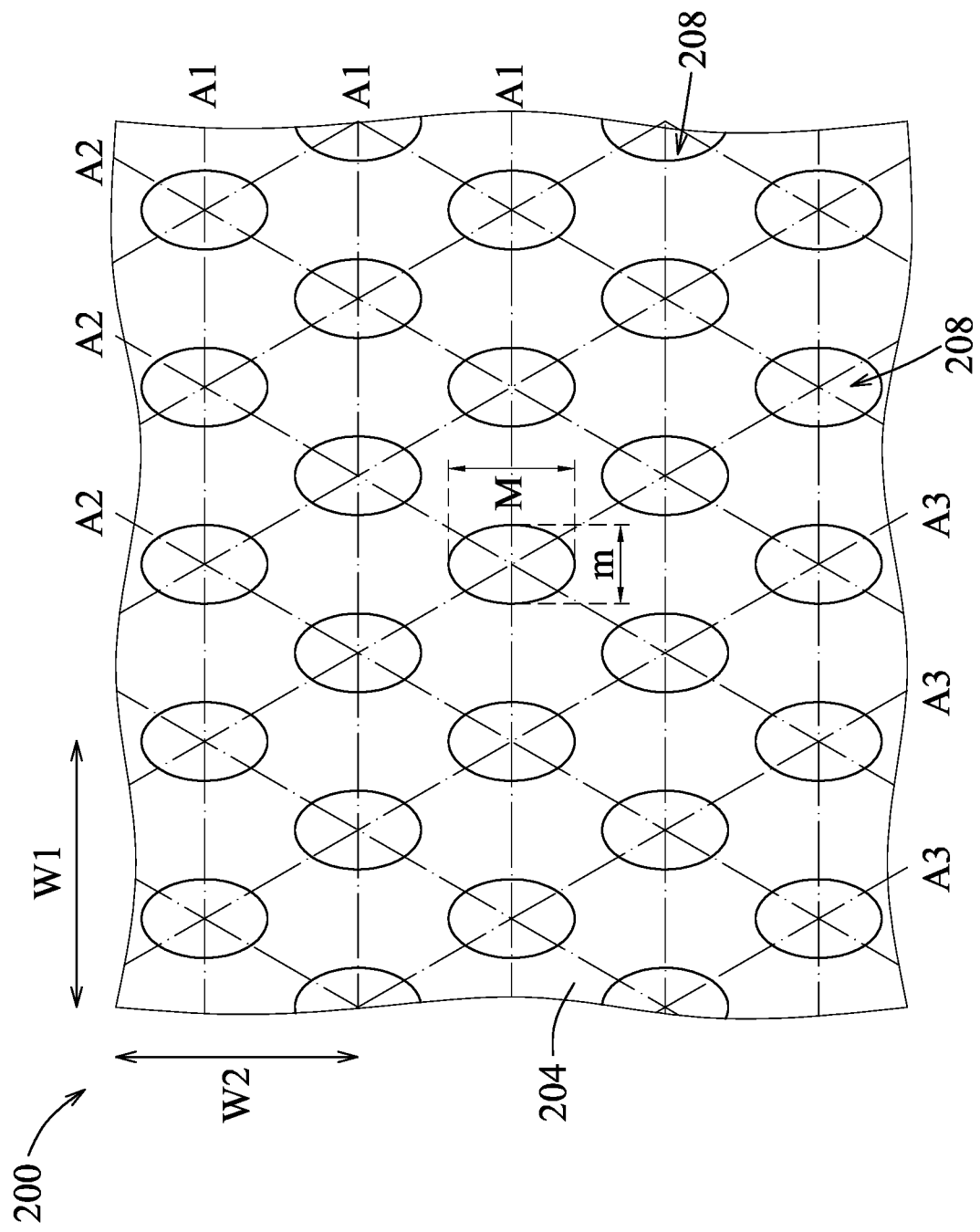

Referring to FIG. 11, in some embodiments, after the nanoparticles 206 (see FIG. 5) are removed to obtain the filter membrane 200, the filter membrane 200 may be stretched only in one direction (e.g., in the second direction (W2)) or stretched largely in one direction and slightly in another direction (e.g., stretched largely in the second direction (W2) and slightly in the first direction (W1)), such that the dimension of each of the pores 208 is increased and changed. In some embodiments, each of the pores 208 of the stretched filter membrane 200 has an elliptical cross-section that is substantially parallel to the first surface 210 or the second surface 212 of the polymer layer 204 (see FIG. 6), and that has a major axis (M) and a minor axis (m), where the minor axis (m) determines the smallest particle which can be filtered by the stretched filter membrane 200. In other words, particle contaminants having a minimum diameter greater than the minor axis (m) of the elliptical cross-section of each of the pores 208 of the stretched filter membrane 200 will be blocked by the stretched filter membrane 200 and will be prevented from passing through the pores 208 of the stretched filter membrane 200. In some embodiments, the pores 208 may be arranged in multiple rows with each row extending in the first direction (W1), and the pores 208 in each of the rows may be misaligned with the pores 208 in an adjacent row in the second direction (W2). In some embodiments, the pores 208 may be aligned along the first axes (A1) which are parallel to the first direction (W1), the second axes (A2), each of which forms a 60-degree included angle with the corresponding one of the first axes (A1), and the third axes (A3), each of which forms a 60-degree included angle with the corresponding one of the first axes (A1) and the corresponding one of the second axes (A2). The center of each of the pores 208 lies at an intersection of the corresponding first axis (A1), the corresponding second axis (A2), and the corresponding third axis (A3).

Figure 12:
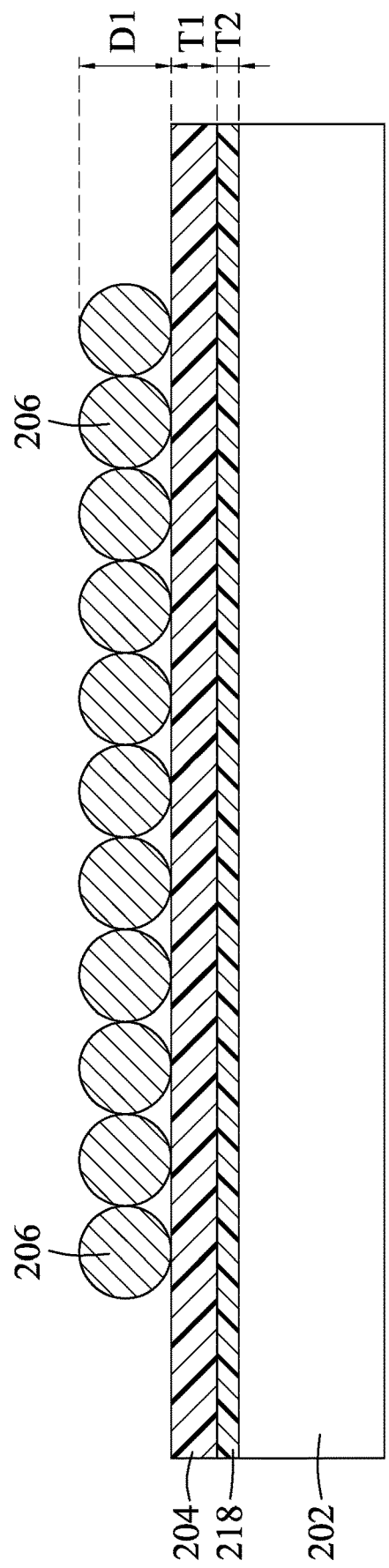
FIGS. 12 to 14 show intermediate steps of another method for making the filter membrane in accordance with some embodiments.

Referring to FIG. 12, in some embodiments, a removable substrate 218 may be formed on the holder 202 before the formation of the polymer layer 204. In other words, the removable substrate 218 is disposed on the holder 202 and the polymer layer 204 is disposed on the removable substrate 218. In the step of applying the nanoparticles 206, the nanoparticles 206 are applied onto the polymer layer 204 and are self-assembled thereon. In some embodiments, a combination of the thickness (T1) of the polymer layer 204 and a thickness (T2) of the removable substrate 218 may be smaller than the diameter (D1) of each of the nanoparticles 206. In some embodiments, the removable substrate 218 allows the centers of the nanoparticles 206 to be substantially located at the center of the polymer layer 204, resulting in a structure where the first and second diameters (D2, D3) of each of the pores 208 (see FIG. 14) to be substantially the same.

Figure 13:
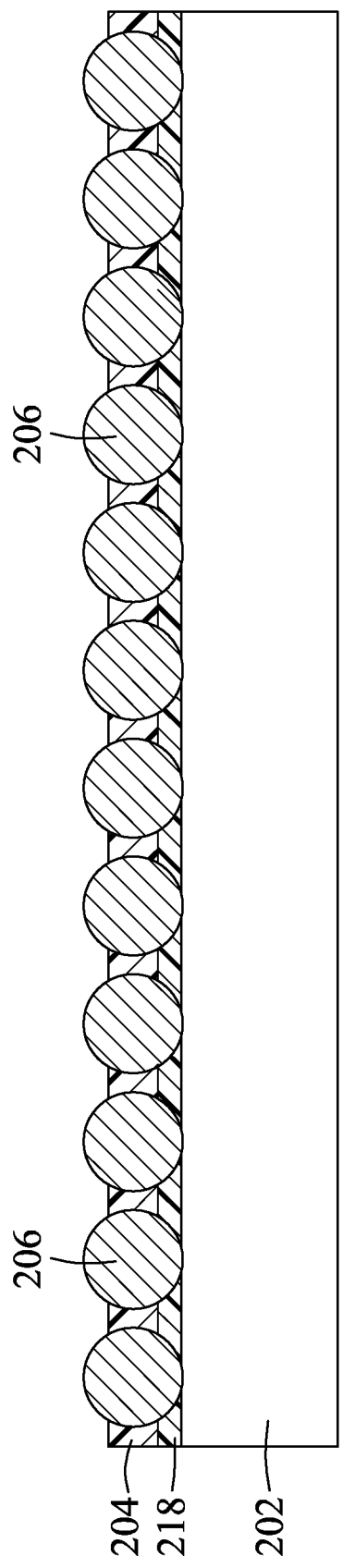

Referring to FIG. 13, in some embodiments, in the step of heating the nanoparticles 206, the nanoparticles 206 are embedded in the polymer layer 204 and the removable substrate 218, and are in contact with the holder 202.

Figure 14:
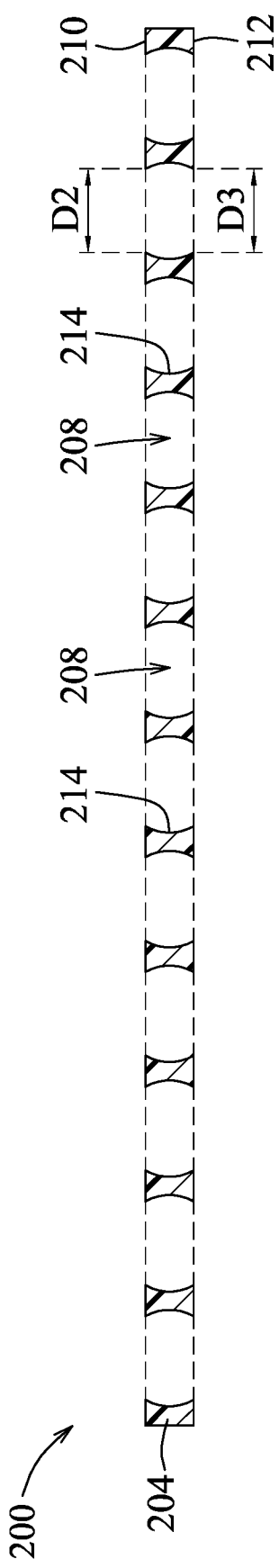

Referring to FIGS. 13 and 14, in some embodiments, in the step of removing the polymer layer 204, the removable substrate 218 and the polymer layer 204 together with the nanoparticles 206 may be removed from the holder 202, followed by removing the removable substrate 218 from the polymer layer 204 by physically peeling the removable substrate 218 from the polymer layer 204 or removing the removable substrate 218 from the polymer layer 204 by heating, dissolving in an organic solution, acid or other suitable chemicals, photodecomposition, other suitable techniques or any combination thereof. In some embodiments, while the removable substrate 218, the polymer layer 204 and the nanoparticles 206 are disposed on the holder 202, the removable substrate 218 may be first removed by heating, dissolving in an organic solution, acid or other suitable chemicals, photodecomposition, other suitable techniques or any combination thereof, followed by removing the polymer layer 204 along with the nanoparticles 206 from the holder 202.

Referring to FIG. 14, after removing the nanoparticles 206, the filter membrane 200 is obtained. In some embodiments, each of the pore-defining surfaces 214 of the polymer layer 204 may be a rounded curved surface. In some embodiments, the cross-sections of each of the pores 208 parallel to the first and second surfaces 210, 212 have diameters that increase in a direction from the first surface 210 toward a center portion of the polymer layer 204 and that decrease from the center portion of the polymer layer 204 toward the second surface 212. In some embodiments, in each of the pores 208, the first and second diameters (D2, D3) may be substantially the same; and, in other embodiments, the first and second diameters (D2, D3) may not be equal.

The present disclosure provides the filter membrane 200, and a simple and low cost method for making the filter membrane 200. By using the self-assembling property of the nanoparticles 206, the filter membrane 200 having uniform pore dimension and pore distribution (i.e., periodic distribution) can be obtained, thereby achieving superior fluid flux (i.e., the quantity of fluid passing through the pores 208 of the filter membrane 200), filtration efficiency, and filtration precision. Since the polymer layer 204 is chemical-resistant, the filter membrane 200 can be used for filtering a wide variety of fluids with acidic or basic properties, such as etchant used in etching processes, slurry used in chemical mechanical polishing (CMP) processes, or other suitable processes. In some embodiments, the filter membrane 200 may be used for filtering certain particle size (i.e., blocking particles larger than certain size). In other embodiments, multiple filter membranes 200 with different pore sizes may be used for filtering particle sizes in a range. For example, a first filter membrane can be used to remove particles greater than about 70 nm to obtain a fluid. Then, the fluid may be filtered using a second filter membrane with a pore size of about 50 nm, thereby obtaining particles with sizes ranging from about 50 nm to about 70 nm, which may be used in certain applications, such as CMP. The filter membranes 200 may be used in any combination that suits practical requirements. Since the polymer later 204 is elastic, the filter membrane 200 can be stretched in single or multiple directions to adjust the dimension and/or shape of the pores 208, allowing the filter membrane 200 to be used for filtering out particle contaminants with different sizes. The filter membrane 200 may be used for filtering any fluid, including gas, liquid or other suitable states, in any suitable field of application. Multiple filter membranes 200 having the same or different pore dimensions may be used in a single filter device.

In accordance with some embodiments of the present disclosure, a method for making a filter membrane includes: forming a polymer layer; applying a plurality of nanoparticles on the polymer layer, the nanoparticles being self-assembled to form a closed pack arrangement on the polymer layer; heating the nanoparticles such that a portion of the polymer layer contacting the nanoparticles is softened so that the nanoparticles are sunk into the polymer layer; and removing the nanoparticles from the polymer layer so that the polymer layer is formed with a plurality of pores penetrating the polymer layer and being arranged in a honeycomb pattern.

In accordance with some embodiments of the present disclosure, in the step of applying the nanoparticles, the nanoparticles are dispersed in a liquid, followed by applying the liquid to the polymer layer and then removing the liquid.

In accordance with some embodiments of the present disclosure, n the step of applying the nanoparticles, each of the nanoparticles has a density greater than that of the polymer layer.

In accordance with some embodiments of the present disclosure, the nanoparticles are at least one of silicon oxide particles, gold particles, iron particles, or aluminum particles.

In accordance with some embodiments of the present disclosure, in the step of heating the nanoparticles, the nanoparticles are heated to a temperature not less than a glass transition temperature of the polymer layer.

In accordance with some embodiments of the present disclosure, in the step of removing the nanoparticles, the nanoparticles are removed from the polymer layer by stretching the polymer layer such that the nanoparticles are released from the substrate layer, or applying a fluid to the polymer layer to flush away or to dissolve the nanoparticles.

In accordance with some embodiments of the present disclosure, the method further includes, after the step of removing the nanoparticles, stretching the polymer layer to change the dimensions of the pores.

In accordance with some embodiments of the present disclosure, the polymer layer is stretched in such a manner that the diameter of each of the pores is increased.

In accordance with some embodiments of the present disclosure, the polymer layer is stretched in such a manner that each of the pores has an elliptical cross-section that is substantially parallel to the polymer layer.

In accordance with some embodiments of the present disclosure, the method further includes forming a removable substrate such that the polymer layer is disposed on the removable substrate, in the step of heating the nanoparticles, the nanoparticles are sunk into the polymer layer and the removable substrate.

In accordance with some embodiments of the present disclosure, a method for making a filter membrane includes: forming a polymer layer on a holder; applying a liquid with a plurality of nanoparticles dispersed therein on the polymer layer, followed by removing the liquid, the nanoparticles forming a closed pack arrangement on the polymer layer through self-assembling; heating the nanoparticles such that a portion of the polymer layer contacting the nanoparticles is softened so that the nanoparticles extend into the polymer layer and are in contact with the holder; removing the polymer layer from the holder; and removing the nanoparticles from the polymer layer so that the polymer layer is formed with a plurality of pores which correspond in shape with a portion of the nanoparticles in the polymer layer.

In accordance with some embodiments of the present disclosure, the method further includes stretching the polymer layer such that portions of the polymer layer are deformed to change the shapes of the pores.

In accordance with some embodiments of the present disclosure, a filter membrane includes a thermoplastic polymer layer, and a plurality of pores penetrating the thermoplastic polymer layer and being arranged in a honeycomb pattern.

In accordance with some embodiments of the present disclosure, the thermoplastic polymer layer has opposite first and second surfaces. Each of the pores penetrates the first and second surfaces, and has a plurality of cross-sections that are parallel to the first and second surfaces. Diameters of the cross-sections of each of the pores increase in a direction from the second surface toward the first surface.

In accordance with some embodiments of the present disclosure, the thermoplastic polymer layer has opposite first and second surfaces. Each of the pores penetrates the first and second surfaces, and is defined by a pore-defining surface of the thermoplastic polymer layer which is a rounded curved surface connected between the first and second surfaces.

In accordance with some embodiments of the present disclosure, the thermoplastic polymer layer has opposite first and second surfaces. Each of the pores penetrates the first and second surfaces, and is defined by a pore-defining surface of the thermoplastic polymer layer which is connected between and substantially perpendicular to the first and second surfaces.

In accordance with some embodiments of the present disclosure, the pores are arranged in multiple rows with each row extending in a first direction. The pores in each of the rows are misaligned with the pores in an adjacent row in a second direction that is substantially perpendicular to the first direction.

In accordance with some embodiments of the present disclosure, each of the pores has an elliptical cross-section that is substantially parallel to the thermoplastic polymer layer.

In accordance with some embodiments of the present disclosure, each of the pores has a maximum diameter. A difference of maximum diameters among the pores is not greater than about 15%.

The foregoing outlines features of several embodiments so that those skilled in the art may better understand the aspects of the present disclosure. Those skilled in the art should appreciate that they may readily use the present disclosure as a basis for designing or modifying other processes or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for making a filter membrane, comprising:
    forming a polymer layer;
    after forming the polymer layer, applying a plurality of nanoparticles above a top surface of the polymer layer, the plurality of nanoparticles being self-assembled to form a closed pack arrangement above the polymer layer;
    heating the plurality of nanoparticles such that a portion of the polymer layer contacting the plurality of nanoparticles is softened so that the plurality of nanoparticles are sunk from the top surface of the polymer layer into the polymer layer; and
    removing the plurality of nanoparticles from the polymer layer so that the polymer layer is formed with a plurality of pores penetrating the polymer layer, the plurality of pores being arranged in a honeycomb pattern,
    wherein the plurality of nanoparticles are removed from the polymer layer by stretching the polymer layer such that the plurality of nanoparticles are released from the polymer layer.

2. The method as claimed in claim 1, wherein applying the plurality of nanoparticles includes preparing a mixture including a liquid and the plurality of nanoparticles dispersed in the liquid, applying the mixture to the polymer layer, and then removing the liquid from the plurality of nanoparticles.

3. The method as claimed in claim 1, wherein each of the plurality of nanoparticles has a density greater than a density of the polymer layer.

4. The method as claimed in claim 3, wherein the plurality of nanoparticles are silicon oxide particles, gold particles, iron particles, or aluminum particles.

5. The method as claimed in claim 1, wherein, in the heating the plurality of nanoparticles, the plurality of nanoparticles are heated to a temperature not less than a glass transition temperature of the polymer layer.

6. The method as claimed in claim 1, further comprising, after removing the plurality of nanoparticles, stretching the polymer layer to change dimensions of the plurality of pores.

7. The method as claimed in claim 6, wherein the polymer layer is stretched in such a manner that the dimensions of the plurality of pores are increased.

8. The method as claimed in claim 6, wherein the polymer layer is stretched in such a manner that each of the plurality of pores has an elliptical cross-section that is substantially parallel to the top surface of the polymer layer.

9. The method as claimed in claim 1, further comprising, forming a removable substrate such that the polymer layer is formed on the removable substrate, and such that in response to the heating of the plurality of nanoparticles, the plurality of nanoparticles are sunk from the top surface of the polymer layer into the polymer layer and the removable substrate.

10. A method for making a filter membrane, comprising:
    forming a polymer layer on a holder, the polymer layer having a top surface opposite to the holder;
    after forming the polymer layer, forming a plurality of nanoparticles, which are self-assembled in a closed pack arrangement, above the top surface of the polymer layer, the plurality of nanoparticles being spaced apart from the holder;
    heating the plurality of nanoparticles such that a portion of the polymer layer contacting the plurality of nanoparticles is softened so that the plurality of nanoparticles are sunk from the top surface of the polymer layer, the plurality of nanoparticles extend into the polymer layer, and the plurality of nanoparticles are in contact with the holder;
    removing the polymer layer from the holder; and
    removing the plurality of nanoparticles from the polymer layer so that the polymer layer is formed with a plurality of pores which correspond in shape with a portion of the plurality of nanoparticles in the polymer layer,
    wherein each of the plurality of pores has a maximum diameter, and a difference between the maximum diameter of a largest one of the plurality of pores and the maximum diameter of a smallest one of the plurality of pores is not greater than about 15%.

11. The method as claimed in claim 10, further comprising, stretching the polymer layer such that the polymer layer is deformed to change the shape of the plurality of pores.

12. The method as claimed in claim 10, wherein the polymer layer is made of a thermoplastic polymer.

13. A method for making a filter membrane, comprising:
    forming a polymer layer on a holder, the polymer layer having a top surface opposite to the holder;
    after forming the polymer layer, forming a plurality of nanoparticles, which are self-assembled in a closed pack arrangement, above the top surface of the polymer layer, the plurality of nanoparticles being spaced apart from the holder;
    performing a treatment in a way that the plurality of nanoparticles are sunk from the top surface of the polymer layer, the plurality of nanoparticles extend into the polymer layer, and the plurality of nanoparticles are in contact with the holder;
    removing the polymer layer from the holder; and
    removing the plurality of nanoparticles from the polymer layer so that the polymer layer is formed with a plurality of pores which correspond in shape with a portion of the plurality of nanoparticles in the polymer layer,
    wherein the polymer layer is formed by:
    applying a polymer solution on the holder, the polymer solution including a polymer and a solvent,
    performing a heating process to heat the polymer solution on the holder at a first temperature to evaporate the solvent, and
    after the heating process, annealing the polymer solution at a second temperature that is higher than the first temperature and lower than a melting point of the polymer, to thereby obtain the polymer layer.

14. The method as claimed in claim 13, wherein the plurality of pores are arranged in multiple rows each of which extends in a first direction, the plurality of pores in one of the multiple rows being misaligned with the plurality of pores in an adjacent one of the multiple rows in a second direction transverse to the first direction.

15. The method as claimed in claim 14, wherein the plurality of pores are aligned along a plurality of first axes which are parallel to the first direction, a plurality of second axes each of which forms a first predetermined degree with a corresponding one of the plurality of first axes, and a plurality of third axes each of which forms a second predetermined degree with the corresponding one of the plurality of first axes and a corresponding one of the plurality of second axes.

16. The method as claimed in claim 15, wherein a center of each of the plurality of pores lies at an intersection of the corresponding one of the plurality of first axes, the corresponding one of the plurality of second axes, and a corresponding one of the plurality of third axes.

17. The method as claimed in claim 13, further comprising:
stretching the polymer layer after removing the plurality of nanoparticles so as to vary the shape of the plurality of pores.

18. The method as claimed in claim 13, wherein the treatment is performed such that a temperature of the polymer layer is elevated to be greater than a glass transition temperature of the polymer layer, and lower than a melting point of the polymer layer.

19. The method as claimed in claim 13, wherein the plurality of nanoparticles are formed above the top surface of the polymer layer by:
dispersing the plurality of nanoparticles in a first solution to form a mixture,
applying the mixture over the top surface of the polymer layer, and
removing the first solution from the mixture to leave the plurality of nanoparticles above the top surface of the polymer layer.

20. The method as claimed in claim 19, wherein the first solution is removed from the mixture by heating, venting, spinning the holder and the polymer layer, or combinations thereof.

* * * * *